(12) United States Patent
Bosch et al.

(10) Patent No.: US 7,965,633 B2
(45) Date of Patent: Jun. 21, 2011

(54) METHOD OF DOWNLINK RATE CONTROL

(75) Inventors: Peter Bosch, New Providence, NJ (US); Michael B. Greenwald, West Orange, NJ (US); Louis G. Samuel, Swindon (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1085 days.

(21) Appl. No.: 11/301,355

(22) Filed: Dec. 12, 2005

(65) Prior Publication Data

US 2007/0133411 A1 Jun. 14, 2007

(51) Int. Cl.
*H04J 1/16* (2006.01)

(52) U.S. Cl. .......................... 370/232; 370/234; 370/235

(58) Field of Classification Search .......... 370/229–235; 709/206, 223–224, 228, 231–234
See application file for complete search history.

(56) References Cited

U.S. PATENT DOCUMENTS

| | | | | |
|---|---|---|---|---|
| 5,864,678 | A * | 1/1999 | Riddle | 709/235 |
| 6,058,114 | A * | 5/2000 | Sethuram et al. | 370/397 |
| 6,181,686 | B1 * | 1/2001 | Hamalainen et al. | 370/347 |
| 6,912,574 | B2 * | 6/2005 | Scifres et al. | 709/224 |
| 2002/0133598 | A1 * | 9/2002 | Strahm et al. | 709/228 |
| 2003/0103460 | A1 * | 6/2003 | Kamath et al. | 370/236.2 |
| 2004/0027997 | A1 * | 2/2004 | Terry et al. | 370/276 |
| 2004/0071108 | A1 * | 4/2004 | Wigell et al. | 370/328 |

FOREIGN PATENT DOCUMENTS

| | | |
|---|---|---|
| EP | 1 289 223 B1 | 8/2002 |
| GB | 2 361 392 A | 12/2000 |
| WO | WO 03/096553 A2 | 5/2003 |
| WO | WO 03/051078 A1 | 6/2003 |

OTHER PUBLICATIONS

International Search Report and Written Opinion mailed Aug. 5, 2007.
Official Communication pertains to the China Counterpart Application No. 20080046257.4 dated Nov. 23, 2010.

* cited by examiner

*Primary Examiner* — Huy D Vu
*Assistant Examiner* — Dady Chery
(74) *Attorney, Agent, or Firm* — Williams, Morgan & Amerson, PC

(57) ABSTRACT

The present invention provides a method involving at least one base station and at least one mobile unit is provided. The method includes receiving rate control information associated with at least one wireless communication channel between the at least one base station and the at least one mobile unit. The method also includes determining at least one outflow rate to the at least one base station based on the rate control information.

9 Claims, 4 Drawing Sheets

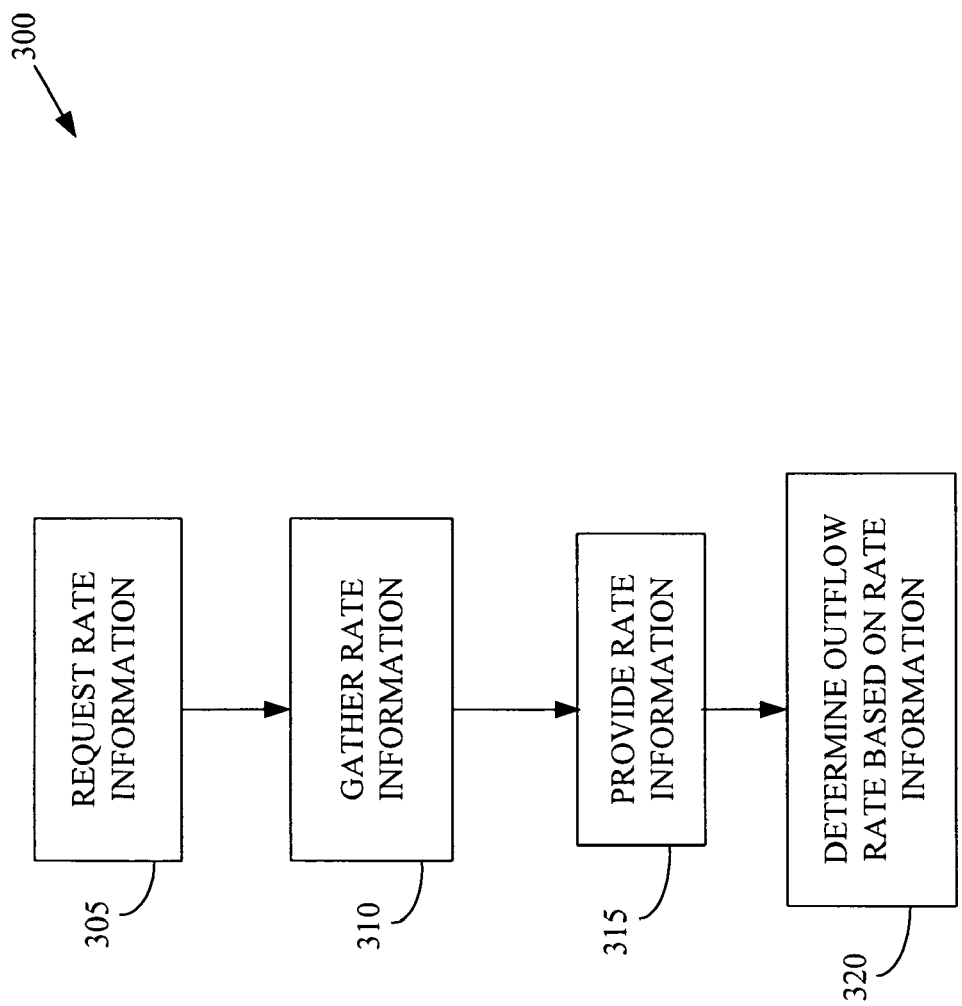

METHOD OF DOWNLINK RATE CONTROL

BACKGROUND OF THE INVENTION

1. Field of the Invention

This invention relates generally to communication systems, and, more particularly, to wireless communication systems.

2. Description of the Related Art

Wireless communication systems provide wireless connectivity to one or more mobile units over one or more air interfaces. Mobile units may also be referred to using terms such as user equipment, mobile terminal, access terminal, and the like. Exemplary mobile units include cellular telephones, personal data assistants, smart phones, text messaging devices, wireless network interface cards, laptop computers, desktop computers, and the like. Wireless connectivity may be provided using one or more wireless communication protocols. Exemplary wireless communication protocols include the Universal Mobile Telecommunication System (UMTS) protocol, the Global System for Mobile communication (GSM) protocol, Code Division Multiple Access (CDMA, CDMA 2000) protocols, the Bluetooth protocol, the IEEE 802 protocols, and the like.

The network environment of a wireless communication system typically depends on the wireless communication protocol implemented by the system. For example, a standard UMTS network environment includes one or more Gateway General Packet Radio Service (GPRS) Support Nodes (GGSNs), Serving GPRS Support Nodes (SGSNs), Radio Network Controllers (RNCs) and base stations (also referred to as Node-Bs). The GGSNs and SGSNs, are typically considered part of a wireless core network. The RNC and the Node-Bs typically form a Radio Access Network (RAN). The GGSN, SGSN and part of the RNC provide IP tunneling functionality and macro-mobility, and the RNCs and Node-Bs provide for wireless transmission and reception functionality and micro-mobility functionality.

In operation, the GGSN and SGSN may shape and/or tunnel packets received from an Internet and provide the shaped/tunneled traffic to the RNC. The RNC may forward the traffic (e.g., in the form of transport blocks) to the Node-Bs, which provide wireless channel communication with one or more mobile units. If a wireless channel needs to be relocated, the RNC may instruct other Node-Bs in the vicinity of the mobile unit to host the wireless radio channel. If the mobile unit is at or near the edge of the area served by the RNC, wireless channels can be relocated from the current RNC to another RNC, but this requires the SGSN to re-route traffic from the current RNC to the other RNC. This rerouting may involve changing SGSNs as well. The point of attachment to the internet, i.e. the GGSN, does not change during these handoffs. The mobile unit remains connected to the same GGSN for as long as the mobile unit hangs on to an IP address.

Wireless communication networks that operate according to Mobile-IP utilize a different network environment. For example, a base station router (BSR) network that operates according to Mobile-IP may include a Mobile-IP Home Agent (HA) and one or more BSR network elements. The HA provides macro-mobility support in collaboration with a Foreign Agent (FA) embedded inside the BSR. This FA is further tightly integrated with the micro-mobility procedures inside the BSR. For example, whenever a radio channel is relocated from one BSR to another BSR by way of the micro-mobility procedure, the HA is notified of this change by a Mobile IP registration procedure, possibly initiated by Proxy Mobile IP functionality inside the BSR. This registration procedure registers a new Mobile IP care-of address inside the HA, which coincides with the BSR that hosts the wireless radio channel. In some embodiments, the FA may include Proxy Mobile IP functionality that may be integrated in the BSR to support a Mobile-IP-unaware mobile unit. A typical deployment scenario for a BSR is to host the Mobile IP HA in a well-networked location, while the BSRs themselves are located in the field, typically connected by slow last-mile copper links. Newly deployed BSRs may be used to replace current wireless base stations and a large fraction of these base stations are still connected by E1/T1s. In some cases, the BSRs may be wired up by cable modems, DSL links, and other slow media.

The rate at which data is transmitted between the network elements may be determined according to the appropriate wireless communication protocol. Within a cellular UMTS system, the GGSN and SGSN can shape the IP traffic as it travels down from an internet into the RAN. The RAN may determine an outflow rate for each mobile unit and provide the outflow rate to the GGSN during call setup for the mobile unit. The GGSN may then shape downlink traffic to the RAN based on the outflow rate determined during call setup. Although the outflow rate from the RAN to the mobile unit may vary during the call, the GGSN typically continues to shape the downlink traffic to the RAN based on the outflow rate determined during call set up, e.g., rate control in a UMTS system is not dynamic.

The current Mobile IP HA does not support any quality of service (QoS) or traffic shaping functionality. This means that all data that arrives in the HA is forwarded immediately to the BSR, regardless of the outflow rate that may be used to transmit data to the mobile unit over the air interface. Consequently, IP queues may build up in the BSR when the data outflow rate out of the BSR, i.e. over the wireless radio channel, is less than the inflow rate into the BSR. Large queues may cause the Transmission Control Protocol (TCP) to perform in an unexpected and/or undesirable manner. For example, when multiple TCP sessions are tunneled through the same wireless channel to the mobile, the combined effects of a large queue inside the BSR (or RNC for that matter) and Radio Link Control (RLC) link-layer retransmissions may cause the TCP sessions to oscillate. In addition, when a downlink packet is lost, large network buffers may lead to long recovery periods.

Large queues may also impact the performance of the wireless communication system during handoffs. For example, to perform a lossless relocation from source BSR to target BSR, all state associated with the radio channel needs to be copied from the source BSR to target BSR. This state may include the layer-2 state, such as Medium Access Control (MAC), RLC and Packet Data Convergence Protocol (PDCP) parameters. The state also includes all pending IP packets that have been received by the BSR but have not yet been transmitted over the wireless radio channel. As discussed above, the BSRs are typically connected to the backhaul link by slow links, such as last-mile copper links, E1/T1 links, cable modems, DSL links, and the like. Copying large IP queues may therefore reduce the maximum handover rate of live wireless radio channels, e.g. radio channels carrying IP traffic. If the BSR were to queue a typical maximum sized TCP congestion window of 64 KB, the handover time over a T1 would be minimally 300 ms. In other words, at most 3 handovers per second can be supported on a T1/E1-based BSR backhaul if the length of the queue inside the BSR is approximately equal to 64 KB.

To avoid TCP performance and/or handover problems, it is common practice to limit the queue lengths inside routers such as the BSR to a relatively short queue. Floyd and Jacobson [FvJ93] proposed a Random Early Drop (RED) scheme that marks and drops packets as soon as the queue length in the router exceeds a certain threshold. Brakmo, O'Malley and Peterson [BOP94] present a scheme (TCP Vegas) to enable TCP to respond gradually to variation in round-trip-delay rather than packet drops, avoiding radical rate reductions and long recovery periods. More recently, Jin, Wei, and Low [JWL04] presented a congestion control scheme particularly to deal with high-speed, high-latency TCP flows. The proposed techniques manage a queue inside the network and selectively drop IP frames from TCP/IP sessions. In a manner consistent with the end-to-end Internet architecture, they signal and indirectly control the input rate of traffic sources by assuming that the sources will detect increased delay and/or drops and reduce their rates accordingly.

The proposed techniques also assume that the queue is located immediately prior to the bottleneck resource. Thus, a queue builds immediately before the bottleneck link(s). However, the queue capacity is typically constrained to be small to minimize the amount of data transferred on handoff and keep handoff times short. Consequently, the actual bottleneck will be the channel between the BSR and the mobile unit even though the link between a home agent (HA) and a BSR is a precious resource. In the Internet setting, queue size is controlled by feedback from the endpoints. However, the round-trip time is long compared to the rate of change of the outflow rate from the bottleneck queue. The proposed techniques also assume that the HA and/or BSR will transmit data over the slow backhaul link and there is no conventional method of controlling the traffic on the valuable HA-BSR link. Uncontrolled sources (e.g. UDP traffic) can therefore flood the HA-BSR link with traffic destined to be dropped immediately on the link between the BSR and the mobile unit. Even congestion-aware sources cannot react quickly enough to changes in outflow rate, so the HA-BSR link will be used inefficiently even among TCP sources.

The outflow rate of the wireless downlink channel is not fixed but varies over time. For example, high data rate techniques such as High Speed Downlink Packet Access (HSDPA) techniques, EV-Data-(DO) techniques, and the various 802.16 techniques can schedule the downlink based on the actual wireless channel conditions to improve the efficiency of the wireless channel. For another example, the outflow rate for conventional circuit-switched technologies such as CDMA 1xRTT and UMTS R99 is not predictable because retransmissions and control message overhead may compete with regular traffic for bandwidth over the wireless radio channel.

Traffic shaping may be performed at the BSR to account for the variations in the outflow rate. However, the input rate, and therefore the queue size in the BSR, will be determined by the aggregate endpoints whose traffic travels over the BSR. If the endpoints don't react in a timely manner the (short) BSR queues will overflow, and a potentially large number of packets will be discarded. In the Internet setting, queue size is controlled by feedback from the endpoints. For example, the round-trip time between the endpoints may be long compared to the rate of change of the outflow rate from the bottleneck BSR queue, which may prevent the endpoints from responding to changes in the outflow rates, leading to discarded packets.

Furthermore, Universal Datagram Protocol (UDP) applications may be able to flood the BSR backhaul link. For example, when an application is transmitting UDP/IP traffic to a mobile client and there is no rate control available in the downlink, the UDP application can easily flood the backhaul thereby interfering with other applications, or even with the basic operation of the BSR. As discussed above, dynamic rate control is also absent in a typical 3GPP deployment.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method involving at least one base station and at least one mobile unit is provided. The method includes receiving rate control information associated with at least one wireless communication channel between at least one base station and the at least one mobile unit. The method also includes determining at least one outflow rate to the at least one base station based on the rate control information.

In another embodiment of the present invention, a method involving a network controller and at least one mobile unit is provided. The method includes providing rate control information associated with at least one wireless communication channel associated with the at least one mobile unit. The method also includes receiving information at an outflow rate determined based on the rate control information.

BRIEF DESCRIPTION OF THE DRAWINGS

The invention may be understood by reference to the following description taken in conjunction with the accompanying drawings, in which like reference numerals identify like elements, and in which:

FIG. 3 conceptually illustrates one exemplary embodiment of a method of controlling outflow rates, in accordance with the present invention.

Figure 1:
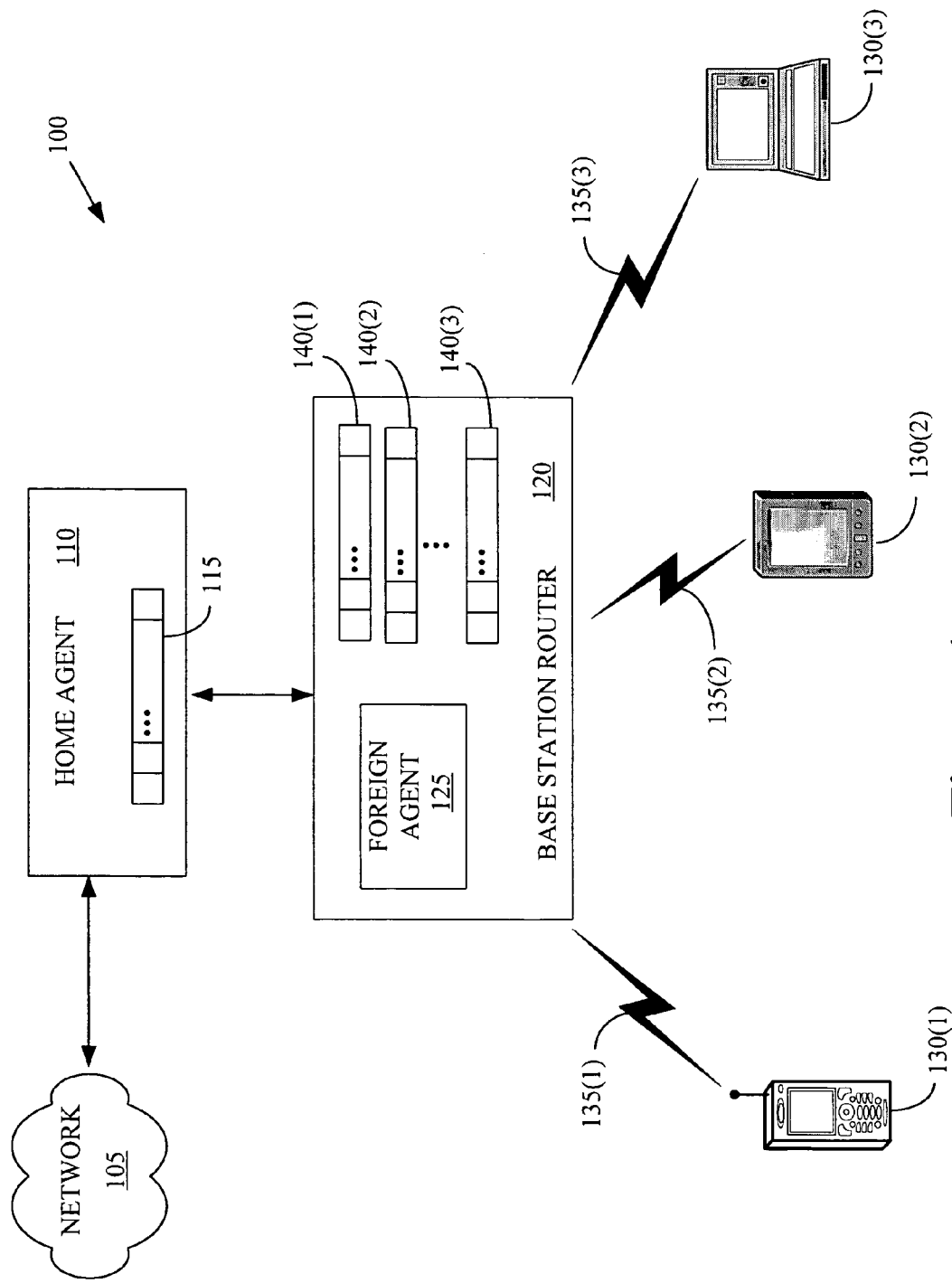
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a communication system 100. In the illustrated embodiment the communication system 100 includes a network 105 such as a public Internet Protocol (IP) network. However, persons of ordinary skill in the art should appreciate that the present invention is not limited to networks 105 that operate according to IP communication protocols. The network 105 is communicatively coupled to a home agent 110. In the illustrated embodiment, the home agent 110 is a Mobile-IP home agent that operates according to the Mobile-IP protocol. However, as discussed above, the present invention is not limited to Mobile-IP implementations. In alternative embodiments that implement other protocols, other network controllers, such as a radio network controller, may be used instead of the Mobile-IP home agent 110. Accordingly, the term "network controller" will be understood to encompass home agents, radio network controllers, and the like.

The home agent 110 may include one or more queues 115. In the illustrated embodiment, the queue 115 is used to store and/or buffer information provided by the network 105 and intended to be transmitted by the home agent 110. However, in alternative embodiments, the queue 115, or other queues not shown in FIG. 1, may be used to store and/or buffer information received by the home agent 110 and intended to be provided to the network 105. The queues 115 may be implemented in any type or number of memory elements and/or registers.

One or more base station routers 120 may be communicatively coupled to the home agent 110. In the illustrated embodiment, the base station router 120 operates according to the Mobile-IP protocol. However, as discussed above, the present invention is not limited to Mobile-IP implementations. Accordingly, in alternative embodiments that implement other protocols, other base station types may be used instead of the Mobile-IP base station router 120. Accordingly, the term "base station" will be understood to encompass base stations, base station routers, node-Bs, an access point, and the like.

In the illustrated embodiment, the base station router 120 includes a foreign agent 125, which may be used to register users with the home agent 110 and to facilitate communication between the base station router 120 and the home agent 110. The home agent 110 and the foreign agent 125 may be communicatively coupled by an in-band communication path, such as a Generic Routing Encapsulation (GRE) tunnel. Accordingly, the home agent 110 and the foreign agent 125 may communicate by exchanging GRE packets, as will be discussed in detail below. Techniques for operating the foreign agent 125 are known to persons ordinary skill in the art and, in the interest of clarity, only those aspects of the operation of the foreign agent 125 that are relevant to the present invention will be discussed further herein.

The base station router 120 provides wireless connectivity to one or more mobile units 130(1-3). For example, the base station router 120 may provide wireless connectivity to one or more of the mobile units 130(1-3) over one or more air interfaces 135(1-3). In the following description, the indices (1-3) may be used to indicate individual devices or subsets of the devices. However, in the interest of clarity, the indices (1-3) may be dropped when a group of devices are referred to collectively. Exemplary mobile units 130 may include, but are not limited to, mobile phones 130(1), personal data assistants 130(2), and laptop computers 130(3). The base station router 120 provides the wireless connectivity according to a Mobile-IP protocol. However, as discussed above, the present invention is not limited to embodiments that implement the Mobile-IP protocol and other protocols may be used in alternative embodiments. Moreover, the mobile units 130 may or may not be Mobile-IP-aware.

The base station router 120 may include one or more queues 140 that may be used to store and/or buffer information that can be transmitted to one or more of the mobile units 130. In one embodiment, each mobile unit 130 (or the corresponding air interface 135) may be associated with one of the queues 140. For example, the queue 140(1) may be associated with the mobile unit 130(1) (or the air interface 135(1)) during call set up. Packets destined for the mobile unit 130(1) may then be stored and/or buffered in the associated queue 140(1) before being transmitted to the mobile units 130(1) over a downlink channel of the air interface 135(1). However, persons of ordinary skill in the art having benefit of the present disclosure should appreciate that this particular arrangement of queues 140 is exemplary and not intended to limit the present invention. In alternative embodiments, any number of queues 140 may be used to store and/or buffer information intended to be transmitted to one or more of the mobile units 130.

The home agent 110 may request rate information associated with the downlink channels of the air interfaces 135 by providing a rate request to the foreign agent 125. The rate information may include information indicating length of one or more of the queues 140, one or more outflow rates associated with the air interfaces 135, a timestamp, and the like. In various alternative embodiments, the home agent 110 may request the rate information at any time. For example, the home agent 110 may request the rate information at predetermined intervals or in response to changes in the operating environment. In one embodiment, the rate request is provided in a packet that is transmitted to the foreign agent 125. For example, the rate request may be indicated using a bit in a header of a GRE packet. The GRE packet including the rate request bit may then be transmitted to the foreign agent 125 using a GRE tunnel.

Figure 2A:
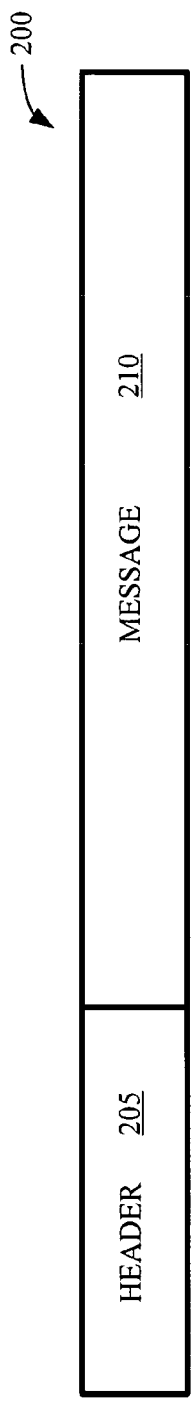
FIGS. 2A, 2B, and 2C conceptually illustrate exemplary embodiments of GRE packets, in accordance with the present invention.

FIG. 2A conceptually illustrates one exemplary embodiment of a GRE packet 200. In the illustrated embodiment, the GRE packet 200 includes a header 205 and a message 210. To tunnel an IP frame by way of GRE, the original IP frame is packaged in a new IP frame with an IP header followed by the GRE packet header 205. The new IP frame header is addressed to the Care of Address (CoA) of the mobile implemented by the FA, while the GRE packet header 205 describes the IP frame that is being forwarded. The GRE packet header 205 consists of a fixed part of four bytes and a variable part. The fixed part bit-field describes which variable parts are included in the GRE packet header 205.

Figure 2B:
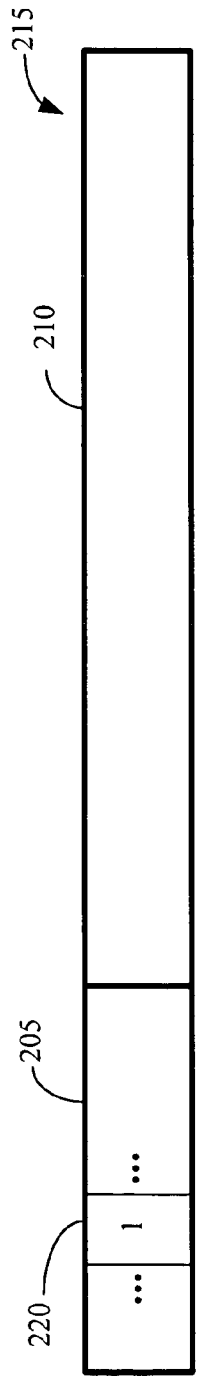

FIG. 2B conceptually illustrates one exemplary embodiment of a GRE packet 215 that includes a rate request bit 220 in the header 205. In the illustrated embodiment, the rate request bit 220 has been set to binary 1 to indicate a rate request. However, persons of ordinary skill in the art having benefit of the present disclosure should appreciate that any value of the rate request bit 220 may be used to indicate whether or not rate information is being requested.

Referring back to FIG. 1, the base station router 120 may provide rate information to the home agent 110. For example, when the home agent 110 enables the rate information bit inside the header of a GRE packet and transmits the packet to the foreign agent 125, the foreign agent 125 may determine one or more outflow rates associated with one or more of the air interfaces 135, one or more lengths associated with the queues 140, a time stamp, and any other requested rate information. In one embodiment, the outflow rate information represents the actual outflow rate over one or more of the air interfaces 135 in a previous time period. Although the outflow rate information may indicate the actual amount of data that has been sent since the last report, the outflow rate information may only be an estimated outflow rate prediction for a future period, at least in part because retransmissions, control information and scheduling decisions inside the base station router 120 may alter the effective available bandwidth in the next period.

In one embodiment, the base station router 120 may provide the rate information in response to a rate request message from the home agent 110. For example, the base station router 120 may provide the rate information in an empty GRE message. Such an empty GRE message may consist of an IP packet header and a GRE header without any payload. In one embodiment, the base station router 120 returns the rate information in an empty GRE message substantially immediately after the foreign agent 125 receives a GRE header with the rate-request bit enabled. Persons of ordinary skill in the art having benefit of the present disclosure should appreciate that the term "substantially immediately" is intended to mean that the foreign agent 125 may provide the rate information as soon as possible after receiving a message such as the rate request message. However, the term "substantially immediately" is also intended to encompass delays associated with gathering the requested information, preparing this information for transmission, or any other delays that are part of the processing that may be required to transmit the rate information in response to the rate request message.

Figure 2C:
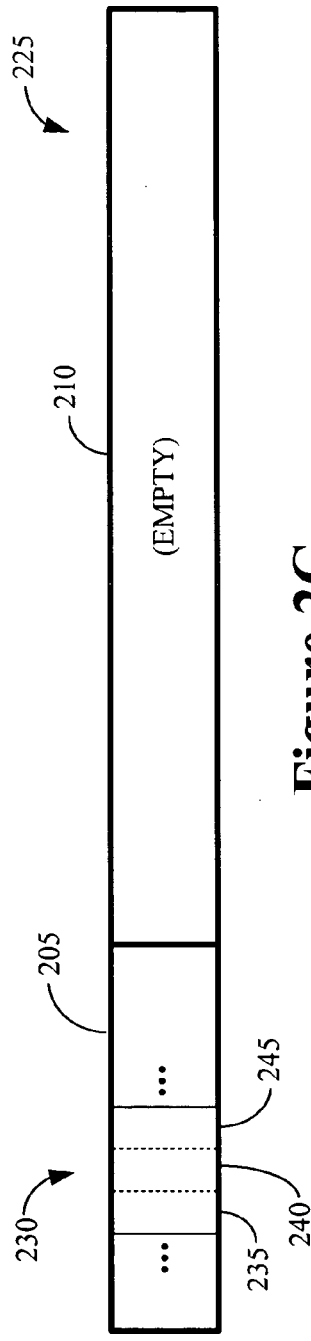

FIG. 2C conceptually illustrates one exemplary embodiment of a GRE packet 225 that includes rate information 230 in the header 205. In the illustrated embodiment, the rate information 230 includes information 235 indicating one or more queue lengths, information 240 indicating one or more outflow rates, and information 245 indicating a timestamp. However, persons of ordinary skill in the art having benefit of the present disclosure should appreciate that the present invention is not limited to the rate information 230 described above. In alternative embodiments, any rate information 230 may be transmitted in the header 205 of the GRE packet 225. In the illustrated embodiment, the message 210 is empty.

Referring back to FIG. 1, the home agent 110 may use the provided rate information to determine an outflow rate from the home agent 110 to the base station router 120. In one embodiment, the home agent 110 may adjust the outflow rate from the home agent 110 to the base station router 120 to correspond to the one or more outflow rates reported by the base station router 120 as part of the rate information. For example, the home agent 110 may slow down or speed up the outflow rate from the home agent 110 to the base station router 120 to correspond to changes in the one or more outflow rates reported by the base station router 120 as part of the rate information.

The home agent 110 may also use the queue length(s) reported with the rate information to determine the outflow rate of the home agent 110. In one embodiment, the home agent 110 uses the one or more queue lengths to adjust for incorrect predictions of the outflow rate from the base station router 120. For example, if the predicted outflow rate over the air interfaces 135 was larger than the actual outflow rate over the air interfaces 135 and the home agent 110 continues to send information to the base station router 120 at the predicted outflow rate, the lengths of one or more of the queues 140 should increase. Thus, if the home agent 110 determines that lengths of one or more of the queues 140 are increasing, the home agent 110 may reduce its outflow rate to the base station router 120. For another example, if the predicted outflow rate prediction over the air interfaces 135 was smaller than the actual outflow rate over the air interfaces 135 and the home agent 110 continues to send information to the base station router 120 at the predicted outflow rate, the lengths of one or more of the queues 140 should decrease. Thus, if the home agent 110 determines that lengths of one or more of the queues 140 are decreasing, the home agent 110 may increase its outflow rate to the base station router 120.

The home agent 110 may use the time stamp that is part of the rate report for various purposes. In one embodiment, the home agent 110 uses the timestamp as a sanity check. For example, if the timestamp indicates a time that is significantly different than the present time, the home agent 110 may determine that the rate information is erroneous. The home agent 110 may also use the time stamp to detect out-of-order reports. In some embodiments, the home agent 110 may then use the time stamp to re-order the reports. Furthermore, the home agent 110 may use the time stamp to determine how many packets are in-flight between the home agent 110 and the foreign agent 125.

In one embodiment, the home agent 110 may use the received rate information to estimate a round-trip delay between the home agent 110 and the foreign agent 125. For example, as discussed above, the foreign agent 125 may provide an empty GRE message substantially immediately after receiving a rate request from the home agent 110. The home agent 110 may then use the empty GRE message to estimate the round-trip delay between the home agent 110 and the foreign agent 125, e.g., by comparing the time at which the rate request message was sent and the time at which the rate information message was received. The home agent 110 may use the round-trip delay to determine how much data may potentially be in-flight to the foreign agent 125, which may enable the home agent 110 to calculate the maximum possible effect of this in-flight data on the lengths of one or more of the queues 140. The home agent 110 may also use the round-trip delay information to determine when rate request messages may have been lost. If the home agent 110 determines that a rate request message has been lost, the home agent 110 may decide to reduce the outflow rate to the base station router 110.

In addition to controlling the lengths of one or more queues 140 inside the base station router 120, the rate control mechanism inside the home agent 110 may also differentiate rate control on a per-session basis. For example, quality-of-service (QoS) parameters may be associated with individual Diffserv markings at the home agent 110. The class of data is determined by the Diffserv marking and the HA QoS scheduler (not shown) can then prioritize between the various classes through this label. For example, the HA QoS scheduler can use different probabilities ranges for the various classes of data when the queue(s) 140 inside the base station router 120 become too long, or when the home agent 110 needs to schedule both constant bit rate (CBR) and variable bit rate (VBR) data, it can prioritize the CBR data over VBR data. Other scheduling schemes may alternatively be used. The QoS parameters may be sent from the base station router 120 to the home agent 110 in-band through the GRE tunnel.

FIG. 3 conceptually illustrates one exemplary embodiment of a method 300 of controlling outflow rates. In one embodiment, the method 300 may be implemented in a wireless communication system that operates according to Mobile-IP. However, as discussed above, the method 300 is not limited to wireless communication systems that operate according to Mobile-IP. In alternative embodiments, the method 300 may be implemented in wireless communication systems that operate according to any protocol. For example, the method 300 may be implemented in wireless communication systems that operate according to the Universal Mobile Telecommunication System (UMTS) protocol, the Global System for Mobile communication (GSM) protocol, Code Division Multiple Access (CDMA, CDMA 2000) protocols, the Bluetooth protocol, the IEEE 802 protocols, and the like.

In the illustrated embodiment, rate information is requested (at 305). For example, a home agent or other network controller may request (at 305) the rate information using a rate information request message. The rate information may be gathered (at 310), e.g., in response to receiving the request for a rate information. For example, a base station router or other base station may gather (at 310) rate information such as an outflow rate, a queue length, a timestamp, and the like. The rate information may then be provided (at 315), e.g., to the home agent or other network controller. An outflow rate from the home agent or other network controller may then be determined (at 320) based on the rate information, as discussed in detail above.

Figure 4:
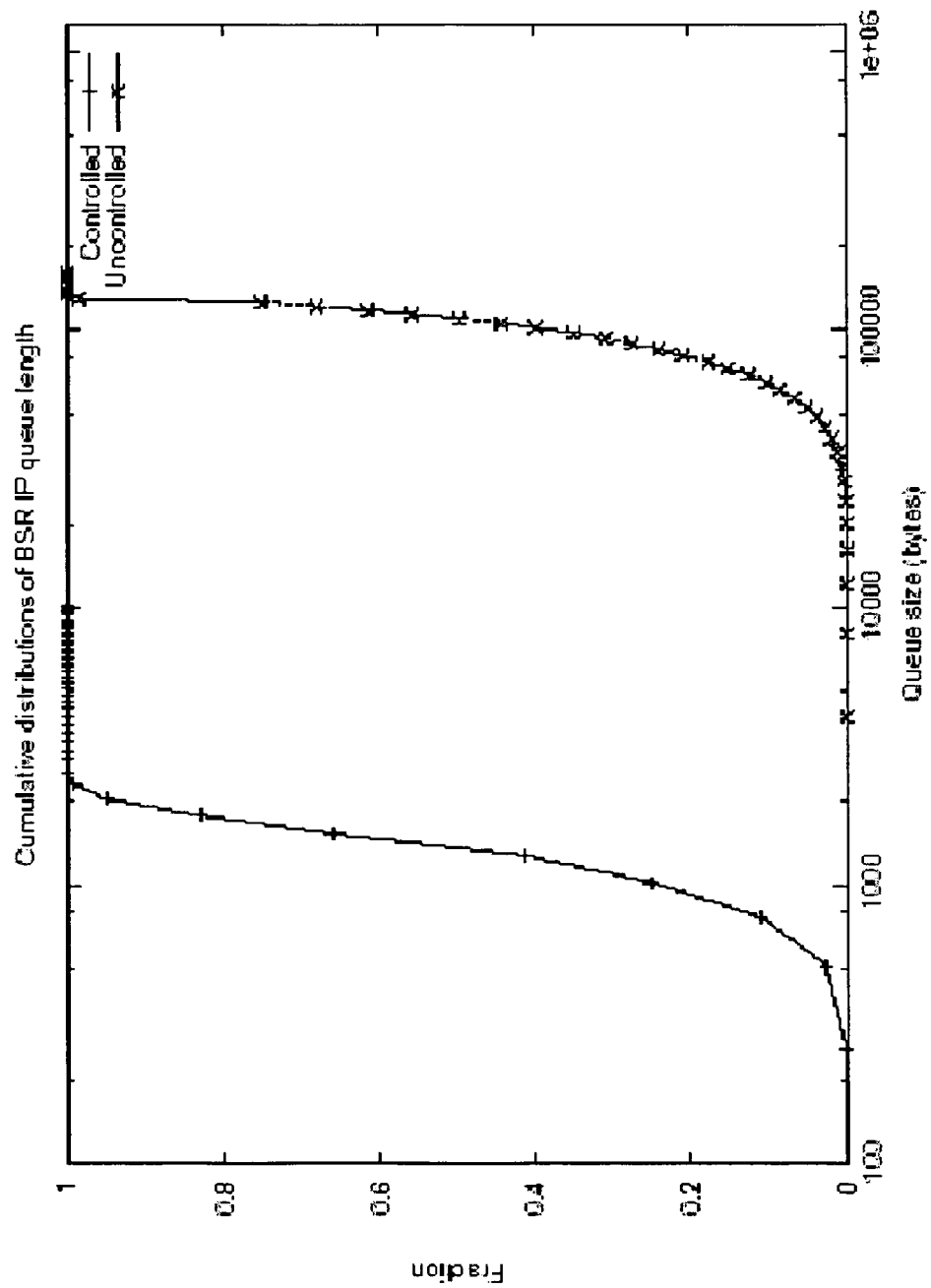
FIG. 4 shows a comparison of rate control experiments in a system with and without rate control, in accordance with the present invention.

FIG. 4 shows a comparison of rate control experiments in a system with and without rate control. Embodiments of the rate control techniques discussed above may reduce the length of the IP queue(s) inside the base station router. FIG. 4 presents the IP queue lengths when the outflow through the home agent is rate controlled and uncontrolled for a 384 Kb/s downlink wireless radio channel in a UMTS BSR system. In both cases, ten parallel TCP/IP sessions were sharing the same wireless channel. As is shown in FIG. 4, rate control of the wireless channel has great impact on the length of the BSR IP queue.

Embodiments of the rate control techniques described above have a number of advantages over conventional practice. For example, the length of queue inside the BSR may be reduced by adjusting the outflow rate from the Mobile IP HA to the actual wireless channel outflow rate to the mobile on a per-mobile basis at the well-connected Mobile IP HA. Consequently, the amount of state information that needs to be copied whenever the system needs to perform wireless channel relocation may be reduced, which may decrease delays associated with handovers and increase the system efficiency. For example, reducing the length of the BSR IP queue may permit the system to avoid having to copy large quantities of IP frames over the slowest links in the backhaul when a mobile is relocated from BSR to BSR.

The techniques described above shift the bulk of the queue from the bottleneck BSR to the well-connected Mobile IP HA, which may allow the Mobile IP HA to better manage traffic over slow last-mile copper links. The techniques described above may also provide the HA with the ability to control the length of the queue inside the remote network element, e.g., the BSR. The HA may also control the queue on a per-IP address basis, rather than the aggregate length of the IP queue inside the BSR. In addition, using queue management techniques inside the HA may improve the behavior of TCP over wireless channels.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method comprising:
receiving, at a home agent, rate control information associated with at least one wireless communication channel between at least one base station and at least one mobile unit, the rate control information being received from a foreign agent associated with said at least one base station and being indicative of at least one of a queue length associated with said at least one base station, at least one outflow rate from said at least one base station to said at least one mobile unit over said at least one wireless channel during a selected time period, and a time stamp;
determining a round-trip delay between the home agent and the foreign agent based on the received rate control information; and
determining, at the home agent, at least one outflow rate to said at least one base station based on the round-trip delay.

2. The method of claim 1, comprising providing, from the home agent to the foreign agent, a request for the rate control information.

3. The method of claim 2, wherein receiving the rate control information comprises receiving the rate control information in response to providing the request for the rate control information.

4. The method of claim 2, comprising determining the round-trip delay by comparing a time that the request for the rate control information was sent and a time the rate control information was received.

5. The method of claim 4, wherein determining said at least one outflow rate to said at least one base station comprises determining that at least one message including the rate control information was lost based on the round-trip delay.

6. The method of claim 5, wherein determining said at least one outflow rate to said at least one base station comprises reducing said at least one outflow rate to said at least one base station in response to determining that at least one message including the rate control information was lost.

7. The method of claim 1, wherein determining said at least one outflow rate comprises determining said at least one outflow rate to control at least one length of at least one queue associated with said at least one base station.

8. The method of claim 7, wherein determining said at least one outflow rate to said at least one base station comprises estimating at least one length of said at least one queue associated with said at least one base station based on the rate control information.

9. The method of claim 1, comprising providing information to said at least one base station at said at least one outflow rate to said at least one base station.

* * * * *